(No Model.)
J. CAVANAGH.
CLOTHES LINE.
No. 359,427. Patented Mar. 15, 1887.
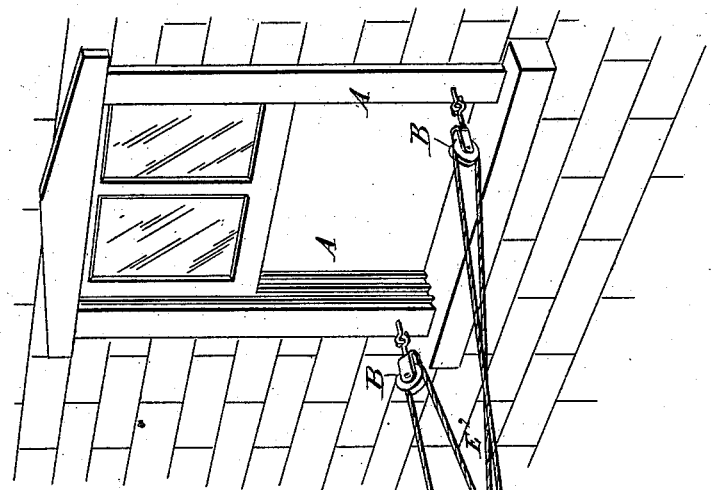
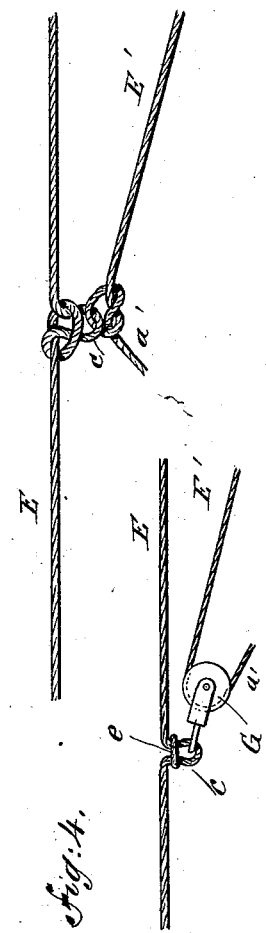
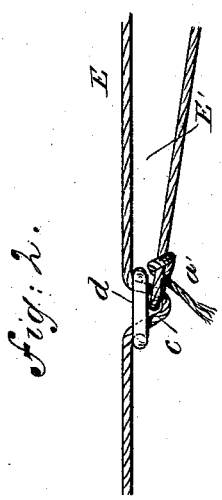
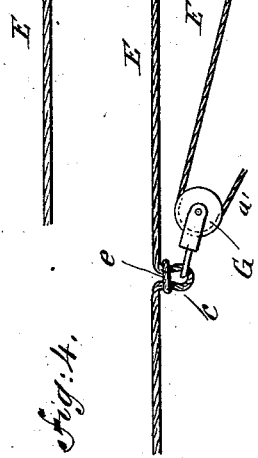
WITNESSES:
Chas. Nida
C. Sedgwick
INVENTOR:
J. Cavanagh
BY Munn & Co
ATTORNEYS.

UNITED STATES PATENT OFFICE.

JAMES CAVANAGH, OF NEW YORK, N. Y.

CLOTHES-LINE.

SPECIFICATION forming part of Letters Patent No. 359,427, dated March 15, 1887.

Application filed July 29, 1886. Serial No. 209,443. (No model.)

*To all whom it may concern:*

Be it known that I, JAMES CAVANAGH, of the city, county, and State of New York, have invented a new and Improved Clothes-Line, of which the following is a full, clear, and exact description.

My invention relates to a clothes-line joined to form angles and to pass over three pulleys—two at the window and one at the post—so that two full-length lines are made available for clothes, the whole line being only three times the length of the distance from the window to the post; and my invention consists in uniting the line by a loop or pulley, so that any slack can be easily taken up, as hereinafter described and claimed.

Reference is to be had to the accompanying drawings, forming a part of this specification, in which similar letters of reference indicate corresponding parts in all the figures.

Figure 1 is a perspective view of a clothes-line applied to a window-frame and post and united in accordance with my invention. Fig. 2 is a detailed view showing one end of the line united to the main line by means of a loop formed with a link. Fig. 3 shows the end of the line united to the main line by means of a loop formed by knotting the main line, and Fig. 4 is a detailed plan view showing a modification.

In the window-frame A, I secure two pulleys, B B, and to the post C, I secure a single pulley, D. Over these pulleys I place the line E, and unite the ends $a\ a'$ thereof to the main length of the line to form the angles $E'\ E^2$. The end $a$ of the line is provided with the link or eye $b$. The end $a'$ is passed through and tied in a loop or eye, $c$. The loop $c$ is, by preference, formed by passing a part of the line E folded through a link, $d$; but it may be formed by knotting the line itself, as shown in Fig. 3, or by tying the loop by a separate cord, $e$, as shown in Fig. 4; or, instead of either of these, I may use a pulley, G, connected to the rope in any suitable manner, as shown in Fig. 4, over which the end $a'$ may be passed, as shown in said last-mentioned Fig. 4. The line passes freely through the loop $c$ or over the pulley G, so that in order to take up any slack in the rope it is only necessary to draw the line along over the pulleys to bring the end $a'$ near to the window-frame A, and then untie the end $a'$ and grasp it and draw it through the eye $c$ or over pulley G, as the case may be, and make the end fast again by tying. This can be easily and quickly done.

The angles $E'\ E^2$ are formed by passing the one end of the rope through one of the pulleys B, then through the link $b$, then through the other pulley B. Then the end $a$ of the rope is passed over the pulley D and brought back and attached to the link $b$, and then the other end, $a'$, of the rope is attached to the main line of rope in front of the pulley D by the loop $c$, as shown and above described.

Having thus described my invention, what I claim as new, and desire to secure by Letters Patent, is—

The combination, with the two pulleys B B, attached to the window-frame, and the pulley D, attached to the post C, of the line E, passed over all the pulleys to form the angles $E'\ E^2$, and formed with the open-loop connection $c$, or equivalent device, as described, to which the end $a'$ of the line is attached, and whereby any slack in the line can be easily taken up, substantially as described.

JAMES CAVANAGH.

Witnesses:
   H. A. WEST,
   C. SEDGWICK.